United States Patent [19]

Ju

[11] Patent Number: 5,216,526

[45] Date of Patent: Jun. 1, 1993

[54] METHOD FOR CONTROLLING PAPER-FEEDING BY DETECTING A STARTING POINT OF SCANNING IN A FACSIMILE SYSTEM

[75] Inventor: Du-Sik Ju, Gumi, Rep. of Korea

[73] Assignee: SamSung Electronics Co., Ltd., Suwon, Rep. of Korea

[21] Appl. No.: 454,999

[22] Filed: Dec. 22, 1989

[30] Foreign Application Priority Data

Feb. 28, 1989 [KR] Rep. of Korea ............... 2476/1989

[51] Int. Cl.$^5$ ............................................. H04N 1/04
[52] U.S. Cl. .................................... 358/498; 358/449; 358/475; 358/461; 358/488; 358/496; 355/316; 355/317; 355/308
[58] Field of Search ............... 358/449, 474, 475, 486, 358/488, 494, 496, 498, 461; 355/316, 317, 308

[56] References Cited

FOREIGN PATENT DOCUMENTS

| | | | |
|---|---|---|---|
| 58-13955A | 8/1983 | Japan | 358/475 |
| 0111462 | 6/1984 | Japan | 358/494 |
| 0174068 | 10/1984 | Japan | 358/488 |
| 0242761 | 12/1984 | Japan | 358/488 |
| 0123162 | 7/1985 | Japan | 358/488 |
| 1099416 | 6/1984 | U.S.S.R. | 358/494 |

Primary Examiner—Edward L. Coles, Sr.
Assistant Examiner—Jerome Grant, II
Attorney, Agent, or Firm—Robert E. Bushnell

[57] ABSTRACT

A method for controlling paper-feeder of a facsimile (FAX) system is disclosed. The method especially provides the precise feeding of the document to the scanning point of the FAX system. To achieve the objects, the improvement includes a first step for detecting a document feed in a standby state by using the document feeding detection apparatus, controlling the light-application apparatus when detecting, applying the light at the rear of the scanning area on the front frame, and reading a reference intensity of the scanning area of the front frame by using a image signal processing method for storing; a second step for controlling the subscanning apparatus to move the document being fed in the direction of subscanning, and checking whether the front-end of the document has reached the scanning area of the front frame; and a third step for controlling the subscanning apparatus to stop the movement of the document when, at the conclusion of the second step, the front-end of the document has reached the scanning area of the front frame, and repeating the second step when the document has not reached the position yet.

5 Claims, 5 Drawing Sheets

METHOD FOR CONTROLLING PAPER-FEEDING BY DETECTING A STARTING POINT OF SCANNING IN A FACSIMILE SYSTEM

BACKGROUND OF THE INVENTION

This invention generally relates to control of a paper-feeder of a facsimile (FAX) system, and more particularly, to a control method for precise feeding of the document to the scanning point of the FAX system.

In order to transmit the contents of a document or to perform a self-copying function, using the FAX, the document, in general, must be fed via a document guide. Once the document has been fed to the document guide, the FAX system drives an internal document feeding step motor ($T_XM$) to locate the front-end of the document at a given position, and then scans the document for transmission or copying.

FIG. 1 shows a system block diagram of a known FAX system, in which a numeral reference 12 is a main control unit (MCU) which includes a timer having the functions of RTC (Real Time Clock), DMA (Direct Memory Access) for direct accessing of the memory, and a CPU (Central Processing Unit) for controlling the system, and which supervises the system to control input/output (I/O) related to the operation of the FAX. The numeral reference 14 represents a memory unit, which provides a program data under the control of the MCU 12, and stores the I/O data thereinto. The numeral reference 16 represents a sensor which detects the feeding of the document or the end of document (EOD), in order to generate a detection signal. The numeral reference 18 is a motor driver which drives a transmission motor $T_XM$, or a receiving motor $R_XM$, under the control of the MCU 12. Being supplied with a predetermined power, the numeral reference 20 is an FL (fluorescent) driver for driving a fluorescent (FL) lamp, under the control of the MCU 12. The numeral reference 30 represents an optic lens and a CCD (Charge Coupled Device) 32 performs photo-electrical conversion of the light signal passed through the lens 30 into an electrical signal, for output as serial data.

An image-signal processor 34 then includes an AGC (Automatic Gain Control) circuit and ACC (Automatic Contrast Control) circuit. It is an image processing unit which samples and holds the output data of the CCD 32, controls automatic gain and contrast to perform the analog-to-digital (A/D) conversion, supplying the MCU 12 with the Digitalized data. A plurality of I/O interfaces 24, 26 and 28 interface the MCU 12 with the sensor 16, the MCU 12 with the motor driver 18, and the MCU 12 with the FL driver 20, respectively. The fluorescent (FL) lamp, connected to the FL driver 20, operates under the control of the FL driver. In addition DOC represents a document, and the numeral reference 29 is a mirror.

Referring to FIG. 2, it shows a flow-diagram of a known method for controlling the paper feeding driver. The traditional controls for the paper-feeding driver are described hereinbelow by referring to FIGS. 1 and 2.

As will be apparent from the drawings accompanied, if the FAX as shown in FIG. 1 is supplied with power, it goes into the standby mode by the control of the MCU 12. The word 'standby mode', which is recommended by CCITT (Comite Consultatif International Telegraphique et Telephonique), represents the condition in which the FAX is able to either transmit or receive a document. If it goes into the standby mode, it reads the I/O interface IOF for a designated period of time, to test for detection of document feeding. In the case that no document is fed, it remains in the standby mode. If, whilst in the standby mode, a document is fed and a document-feed signal is generated from the sensor 16, the signal is transferred to MCU 12 through IOF$_1$ 24, and the MCU 12 applies a FL ON/OFF control data into IOF$_3$ 28.

The FL driver 20 is operated by the FL ON/OFF control data, and preheats to turn on the fluorescent lamp 22 on. The exposure of light on the front frame (FRFRM) is initiated by the turning-on of the fluorescent lamp and enters into the CCD 32 via the mirror 29 and lens system 30. The CCD 32 performs photo-electrical conversion to supply the converted signal to the image signal processor 34. The image signal processor 34 performs the digital signal processing in accordance with the commands of the MCU 12, and enters the result into the MCU 12.

The MCU 12 stores the input image data in the memory 14. The intensity of the scanning light on the front frame (FRFRM) becomes the reference waveform. The MCU 12, which has stored the reference intensity of the front frame (FRFRM) through the above operation, outputs the transmission motor driving data to IOF$_2$ 26 for a specified period and moves the inserted document in the subscanning direction.

The motor driver 18, which is driven by the transmission motor driving the data input through IOF 26, drives the transmission motor $T_XM$ to move the document in the subscanning direction. The MCU 12, which has driven the transmission motor $T_XM$ for a specified duration, stops the motor and shifts into the standby mode to detect the entry from the COPY/SEND keys via a data-bus (KDB). It remains in the standby mode while continuously monitoring the entry from COPY/SEND keys. In the above procedure, said specified duration for driving the motor means the period in which the document (DOC) can reach the scanning point from the position of the document feed detection sensor 16.

If the COPY/SEND key is pressed during detection of the entry from the key, the MCU 12 outputs the transmission motor drive data to the IOF$_2$ 26 to drive the transmission motor $T_XM$ and starts the scanning; that is to read the image signal of the document using the CCD 32 and image signal processor unit 34.

The traditional operating method, as described above, drives the transmission motor $T_XM$ in a step-by-step fashion after detection of document feed, and moves the document by rotating a driver roller (not shown), which rotates in accordance with the rotation of the transmission motor $T_XM$. Therefore, the following problems can result:

The driver roller that is used to move the document is made of rubber and is sensitive to any changes in humidity, temperature, and the quality of paper (i.e., the quality of document). Therefore, changes in frictional force causes a drift in the starting point for scanning. In addition, it is not easy to design an optical mechanism allowing a short distance between the driver roller and the front frame, while accurately adjusting the starting point for scanning.

SUMMARY OF THE INVENTION

An object of this invention is to provide a method that continuously operates the paper-feeding driver of document to be transmitted or copied, until the apparatus detects the scanning point of the document by means of software.

Another object of this invention is to provide a method for detecting the scanning point of the document fed.

According to an aspect of the invention, the method for controlling a paper-feeding in a facsimile having an apparatus for detecting feeding, light-applying apparatus to apply an image of the document, and a document subscanning apparatus to move the document to be fed by a designated control, a main control unit and front frame to control the operation of each apparatus using an image processing and document feeding detection apparatus, said method including: a first step for detecting a document feed in a standby state by using the document feeding detection apparatus, controlling the light-application apparatus when detecting, applying the light at the rear of the scanning area on the front frame, and reading a reference intensity of the scanning area of the front frame by using a image signal processing method for storing; a second step for controlling the subscanning apparatus to move the document being fed in the direction of subscanning, and checking whether the front-end of the document has reached the scanning area of the front frame; and a third step for controlling the subscanning apparatus to stop the movement of the document when, at the conclusion of the second step, the front-end of the document has reached the scanning area of the front frame, and repeating the second step when the document has not reached the position yet.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE INVENTION

An embodiment of the invention will be described hereinbelow with reference to the accompanying drawings.

Figure 3:
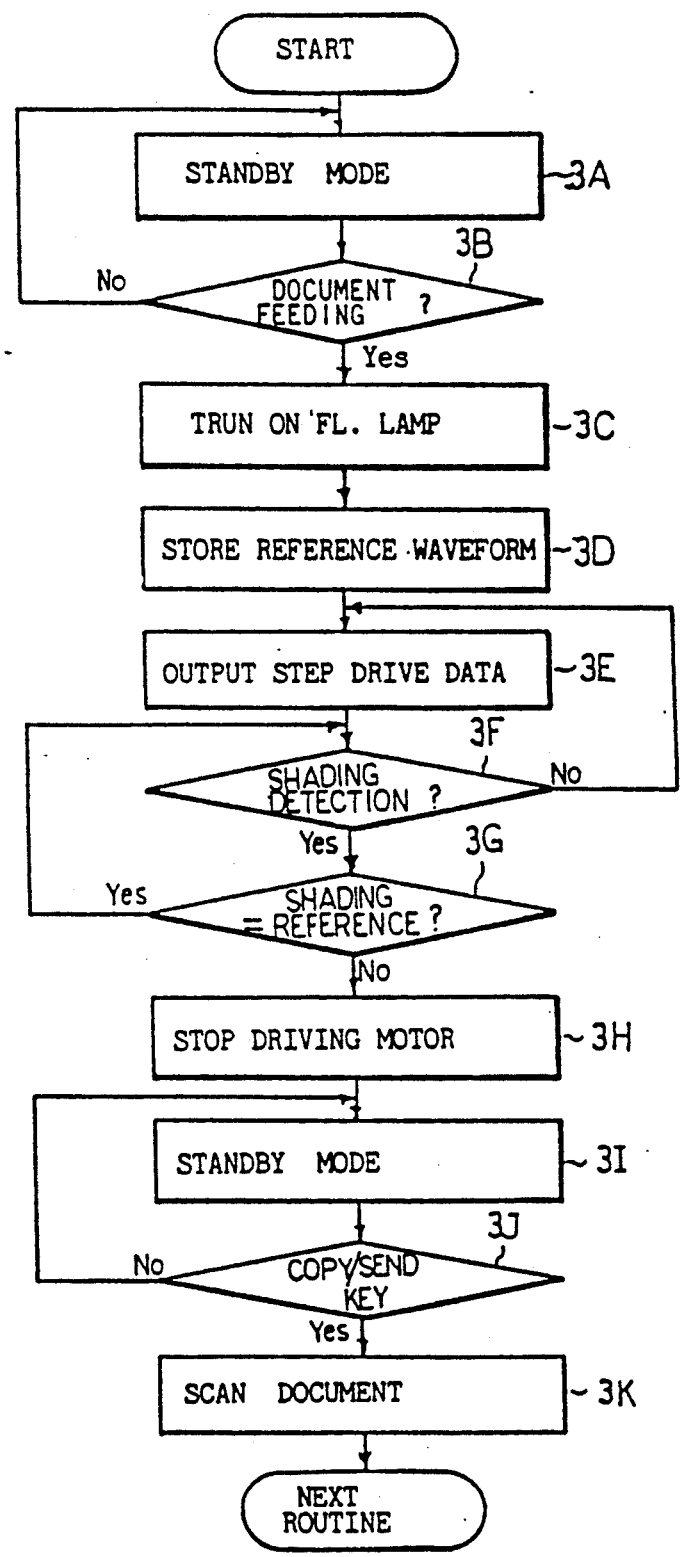
FIG. 3 shows another method for controlling the paper-feeding driver according to the present invention.
Figure 4:
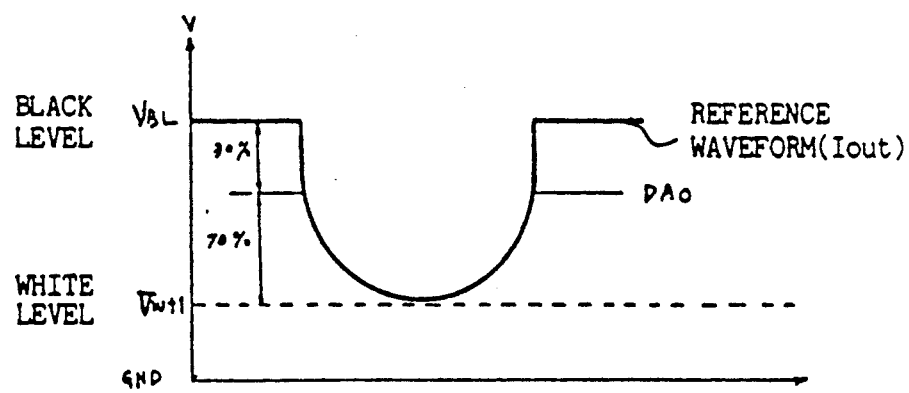
FIG. 4 shows a reference shading waveform of a front frame.

Referring to FIG. 3, it shows a flowchart for controlling the paper feeding driver by detection of the scanning start point according to this invention. And, FIG. 4 represents the reference shading waveform of the front frame. Said front frame represents the rear guide of the document read position, when the scanner (CCD) reads the document being fed in.

In general, a color similar to that of the document is used during the design process; for example, a white lamp.

In FIG. 4, the reference waveform ($I_{out}$) is made by reading the white surface of the front frame using the CCD whilst the fluorescent lamp is turned on. The document signal, which will be compared with the reference waveform ($I_{out}$), is the shading signal DAO which is generated starting from the initial point, that is, 70% of the maximum peak value $V_{w+1}$. $V_{BL}$ represents the black level, and $V_{w+1}$ represents the white level.

Figure 1:
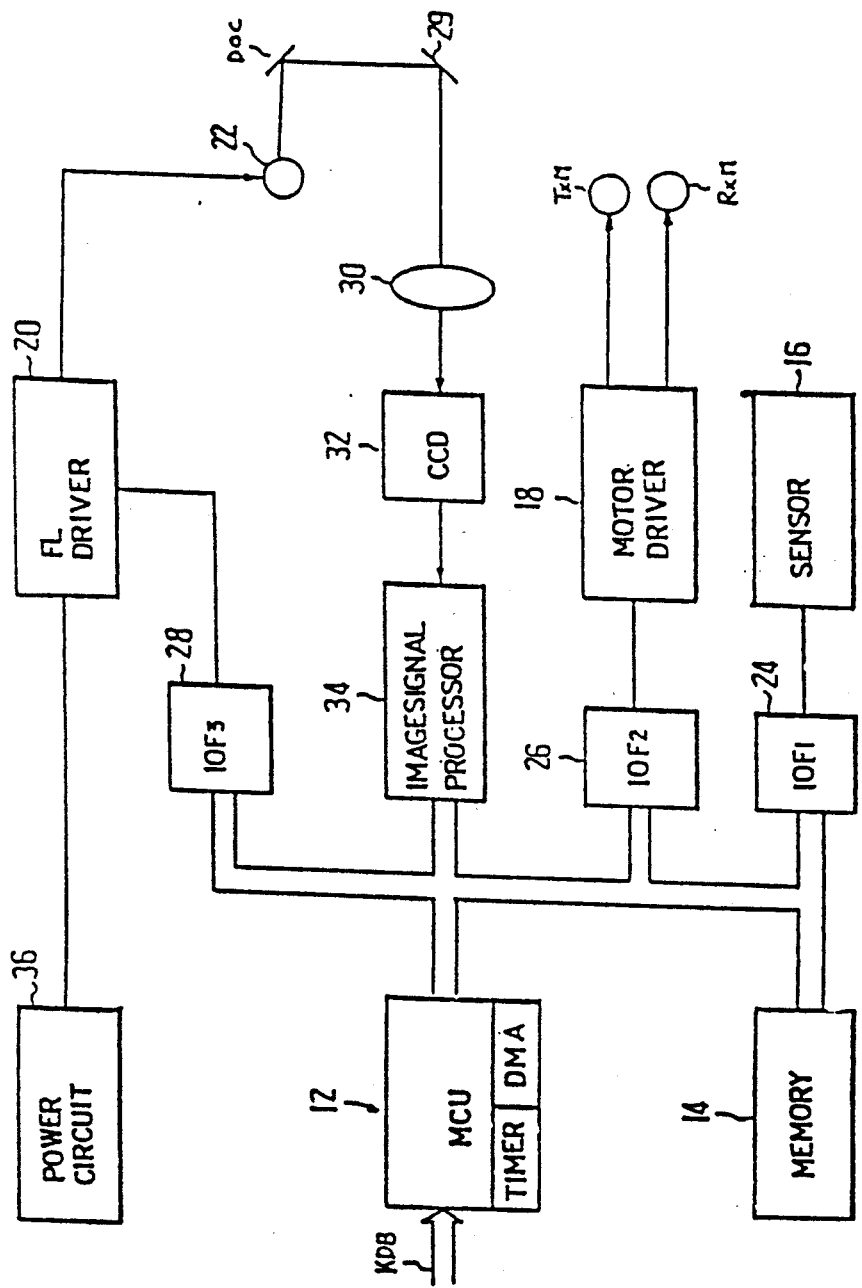
FIG. 1 shows a system block diagram of a facsimile system for carrying out an embodiment according to the present invention.
Figure 5:
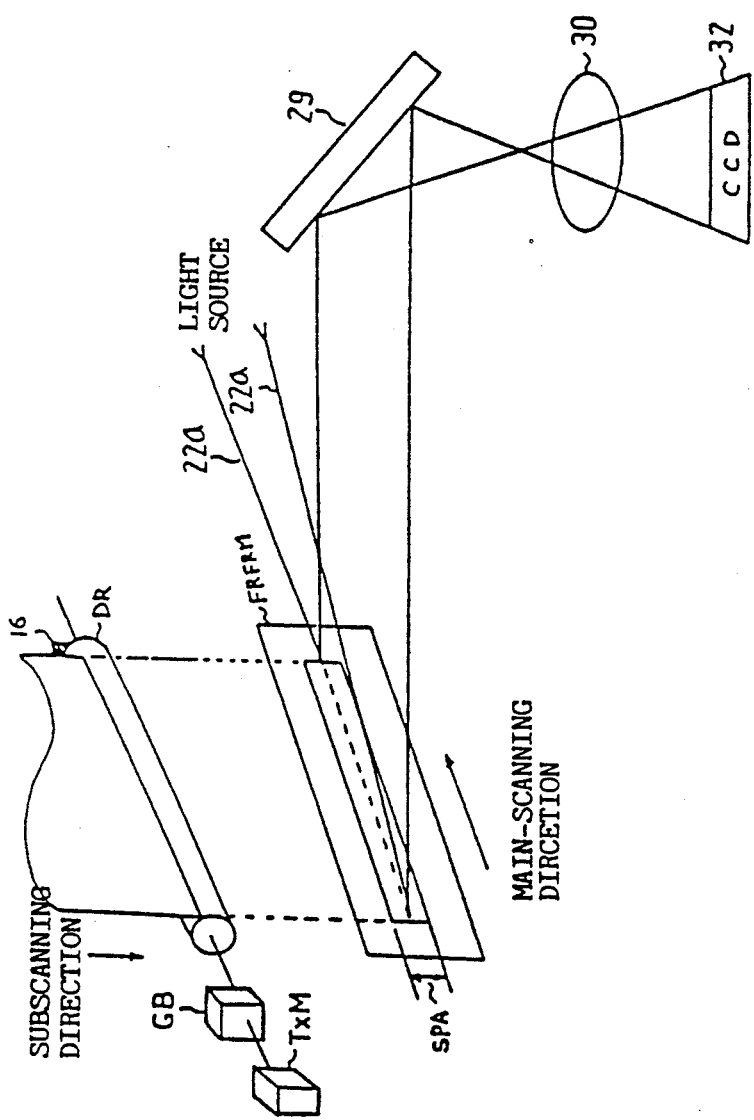
FIG. 5 shows an operational diagram of the paper-feeding driver for explaining the entire operation of the invention.

Referring FIG. 5, it shows the status diagram of the paper-feeding driver, to explain the operation of the invention and detection of the reference waveform. The numeral references 29, 30, and 32 in the figure are mirror, lens, and CCD, respectively, as shown in FIG. 1. FRFRM represents the front frame; DR the driver roller; the numeral reference 16 the sensor; GB the gear box; and $T_XM$ the transmission motor. SPA on the front frame FRFRM is the area for scanning.

Waveform 6, 6A shows the status and reference waveform before the document reaches the scan scanning area on the front frame FRFRM and waveform 6B represents the status and waveform caused by the shading after the document reaches the scanning area SPA.

An operational example of the invention is observed by referring to the hardware block diagrams FIG. 1 and FIGS. 3,4,5 and 6.

As described above, if the system in FIG. 1 is supplied with power from the power circuit 36, the system is initialized and remains in the standby mode as depicted in step 3A of FIG. 3.

In the standby mode, it reads the $IOF_2$ 24 for a designated interval to detect document feeding in step 3B. If it cannot detect document feeding, it repeats the step 3A.

Figure 2:
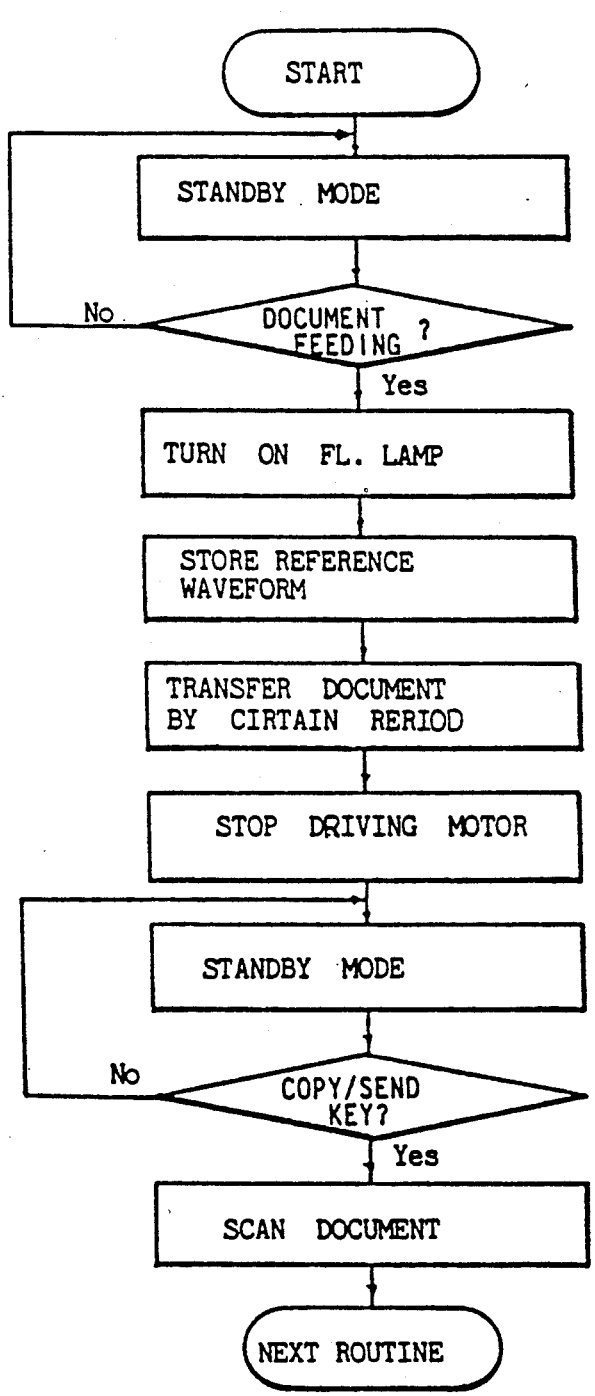
FIG. 2 shows a known method for controlling a paper-feeding driver.

In the above-mentioned status, if a document is fed through the document guide as shown in FIG. 5, the sensor 16 detects the feeding, and the MCU 12 detects it, also. The MCU 12, which detects the document (DOC) feeding, outputs data to preheat and turn-on the fluorescent lamp to the FL driver 20 via IOF3 in step 3C as describe in FIGS. 1 and 2.

After the fluorescent lamp has been turned on, the light source 22a is exposed in the scanning area (SPA) of the front frame FRFRM, and the MCU 12 controls the CCD 32 to main-scan the scanning area SPA, and to read the reference waveform Iout as shown in FIG. 4 through the image signal processing unit 34. In step 3D, the read data is stored in the memory 14.

The MCU 12, which reads the front frame FRFRM to store the reference intensity in step 3D, outputs the step drive data from the subscan direction to the motor driver 18 via IOF2 28 in step 3E.

The transmission motor $T_XM$ is rotated by the motor driver 18 and the driver roller (DR) starts to step-rotate in the direction of the arrow in FIG. 5, by the rotation of the transmission motor $T_XM$.

The MCU 12, which step-drives the transmission motor $T_XM$ in step 3E, detects the shading of the document front-end in step 3F.

If the shading of the document front-end is not detected at the step 3F, it repeats the step 3E. Therefore, the document (DOC) will be moved in the direction of subscanning and, as a result, document (DOC) will get close to the front frame FRFRM. Here, the MCU 12 continues to read the reference intensity data of the scanning area SPA on the front frame FRFRM through the lens 30, CCD 32, and the image-signal processing unit 34.

Figure 6:
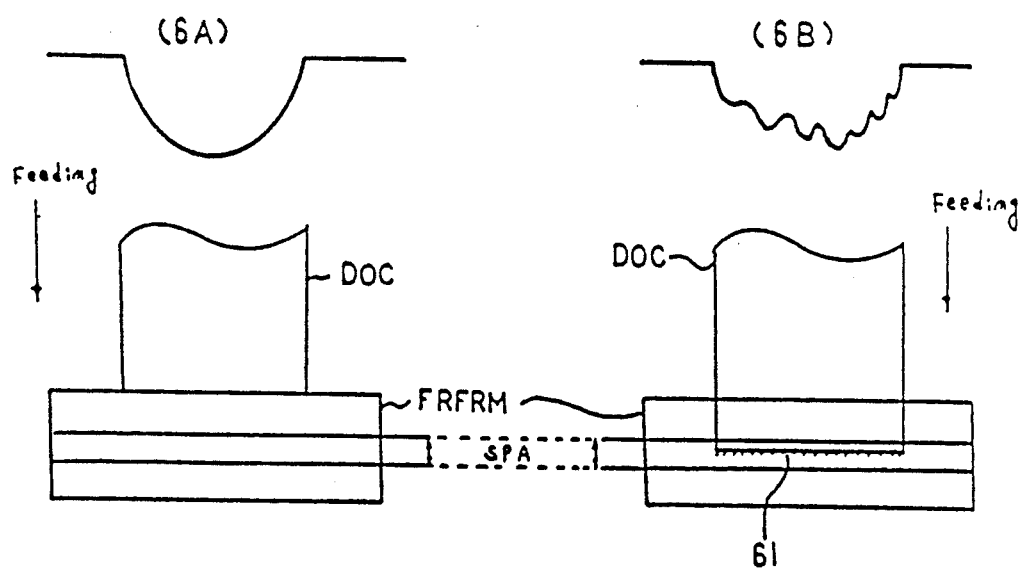
FIG. 6a shows a quick view illustrating the document which is on a beginning point of the paper-feeder.

By repeating the steps 3E and 3F, if the document (DOC) fed has reached the rear of scanning position SPA on the front frame FRFRM through a state of waveform 6A in FIG. 6, the MCU 12, which is continuously reading the reference intensity of the scanning area SPA, will read the shading present.

The shading is caused by applying the light source 22a of the fluorescent lamp 22 when the document (DOC) overlaps the scanning area SPA of the front frame FRFRM.

The MCU 12 which detects the presence of shading compares the intensity data from the shading with the data from the reference intensity, in step 3G. If the comparison result in step 3G is same, it concludes that the document (DOC) has not yet reached the scanning area SPA on the front frame FRFRM, and repeats the step 3F. If the comparison result at step 3G is different, it concludes that the document (DOC) has reached the scanning area SPA and the MCU 12 outputs the motor-drive stop data via IOF$_2$ 26 in step 3H and shifts into the standby mode in procedure 3I. Therefore, the drive of the transmission motor T$_X$M and feeding of the document (DOC) will be stopped.

In step 3I, the MCU 12 returns to the standby mode and, in step 3J, it checks the entry of the COPY/SEND key through the data bus (KDB) that accepts the key data. If there is no entry, it remains in the standby mode. If, however, COPY/SEND key is being pressed, the MCU 12 starts to control the CCD 32 and, in step 3K, scans the document (DOC) to perform the further operations.

As described above, when a document is fed, the invention compares the reference intensity data of the front frame with the intensity data, at which the document being fed has reached the scanning area of the front frame, and feeds the document to the scanning position. The advantages of the invention are its capabilities to detect the scan position exactly and to allow design of a small-sized facsimile easily.

While the invention has been particularly shown and described with reference to a preferred embodiment, it will be understood by those skilled in the art that modifications in detail may be made without departing from the spirit and scope of the invention.

What is claimed is:

1. A method for controlling paper-feeding in a facsimile system having a sensor for sensing a document fed into said facsimile device, said method comprising the steps of:

reading an input/output interface for a signal output by said sensor indicative of a sensed document during a first standby mode;

determining whether or not a document has been fed into said facsimile device by processing said signal read in said reading step;

repeating said reading step if it has been determined that no document has been fed or turning on an illuminating means if it has been determined that a document has been fed;

scanning a scanning area of a front frame of said facsimile device to generate a reference signal, indicative of a reflected intensity of light, said light being generated by said illuminating means, reflected from said scanning area of said front frame and storing said reference signal into a memory;

driving a transmission motor to move said document a predetermined distances;

continuously scanning said scanning area until said facsimile device enters into a second standby mode;

checking for a shading intensity indicative of a front end of said document overlapping said scanning area;

returning to said driving step until a shading intensity is detected in said checking for a shading step;

comparing a signal indicative of said shading intensity to said stored reference signal, when said shading intensity is detected in said checking for a shading step;

repeating said step of checking for a shading intensity if said shading indicative signal is equal to said reference signal;

stopping said driving of said transmission motor when said shading indicative signal and said reference signal are determined not to be equal and entering said facsimile device into said second standby mode.

2. The method a claimed in claim 1, further comprising the steps of:

checking for a copy/send signal from a copy/send key of said facsimile device during said second standby mode;

remaining in said second standby mode if no copy/send signal has been detected in said step of checking for a copy/send signal; and scanning said document when said copy/send signal is detected in said step of checking for a copy/send signal.

3. A method for controlling paper-feeding in a facsimile system having a sensor for sensing the presence of a document fed into said facsimile device, said method comprising the steps of:

checking for the presence of said document during a first standby mode of said facsimile device and remaining in said first standby mode until the presence of said document has been sensed by said sensor;

providing power to a driving circuit for a fluorescent lamp when the presence of said document has been detected in said checking step, light from said fluorescent lamp being reflected from a scanning area of a front frame of said facsimile device;

scanning said scanning area and generating a reference signal indicative of said reflected light; said reference signal being stored in a memory of said facsimile device;

rotating a transmission motor for driving a driver roller to move said document in a predetermined direction for a set distance and checking said reflected light for a shading intensity, said shading intensity being indicative of a front end of said document overlapping said scanning area of said front frame;

comparing a signal indicative of said shading intensity to said stored reference signal;

repeating said checking of said reflected light for a shading intensity when said signal indicative of said shading intensity is equal to said stored reference signal as determined by said comparing step;

stopping said transmission motor from driving said driver roller to thereby stop said document from moving in said predetermined direction when said signal indicative of said shading intensity is not equal to said stored reference signal as determined by said comparing step.

4. The method as claimed in claim 3, further comprising the steps of:
- entering said facsimile device into a second standby mode after said step of stopping said transmission motor;
- checking for a copy/send signal from a copy/send key of said facsimile device;
- remaining in said second standby mode if no copy/send signal has been detected in said step of checking for a copy/send signal; and
- scanning said document when said copy/send signal is detected in said step of checking for a copy/send signal.

5. An apparatus for controlling movement of a document in a facsimile device having a driving roller for transporting said document, said apparatus comprising:
- means for detecting a document being fed into said facsimile device;
- means for driving a fluorescent lamp when said document is detected by said document detecting means, said fluorescent lamp providing a light to a scanning area of said facsimile device;
- means for detecting light reflected from said scanning area and storing an intensity signal of said reflected light, at a first instance of light reflection, as a reference signal;
- means for driving said driving roller in stepped increments for transporting said document in a direction towards said scanning area;
- means for continuously comparing said intensity signal of said reflected light to said reference signal during further instances of light reflection; and
- means for stopping said means for driving said driving roller to stop the movement of said document when said comparing means detects a difference between said intensity signal of said reflected light and said reference signal.

* * * * *

UNITED STATES PATENT AND TRADEMARK OFFICE
CERTIFICATE OF CORRECTION

PATENT NO. : 5,216,526
DATED : 01 June 1993
INVENTOR(S) : Du-Sik Ju

It is certified that error appears in the above-indentified patent and that said Letters Patent is hereby corrected as shown below:

IN THE ABSTRACT

Line 11,    after "using" and before "image signal processing", replace "a" with --an--;

Column 3,

Line 51,    replace "6A" with --6--;

Column 4,

Line 5,    replace "$I_{out}$" with --Iout--;

Line 9,    insert "to" after "Referring";

Line 18,    replace "Waveform 6, 6A" with --In FIG.6, waveform 6A--;

Line 31,    replace "$IOF_2$ 24" with --IOF1 24--;

UNITED STATES PATENT AND TRADEMARK OFFICE
CERTIFICATE OF CORRECTION

PATENT NO. : 5,216,526
DATED : 01 June 1993
INVENTOR(S) : Du-Sik Ju

It is certified that error appears in the above-indentified patent and that said Letters Patent is hereby corrected as shown below:

Column 4,

Line 41,  replace "describe" with --described--;

Line 52,  replace "IOF2 28" with --IOF2 26--;

Column 5,

Line 3,  delete "through a state of waveform 6A in FIG. 6";

Column 5,

Line 68,  replace "distances" with --distance--;

Signed and Sealed this

Thirteenth Day of September, 1994

Attest:

BRUCE LEHMAN

Attesting Officer    Commissioner of Patents and Trademarks